(12) United States Patent
Akiyama et al.

(10) Patent No.: US 10,876,466 B2
(45) Date of Patent: Dec. 29, 2020

(54) WAVE WASHER AND VARIABLE-FLOW-RATE VALVE

(71) Applicants: IHI Corporation, Koto-ku (JP); CHUO HATSUJO KABUSHIKI KAISHA, Nagoya (JP)

(72) Inventors: Yuichiro Akiyama, Koto-ku (JP); Satoshi Ohtani, Koto-ku (JP); Naotada Ueda, Koto-ku (JP); Michihiko Tanigaki, Koto-ku (JP); Hideki Toya, Midori-ku (JP)

(73) Assignees: IHI Corporation, Koto-ku (JP); CHUO HATSUJO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/493,987

(22) PCT Filed: Mar. 7, 2018

(86) PCT No.: PCT/JP2018/008824
§ 371 (c)(1),
(2) Date: Sep. 13, 2019

(87) PCT Pub. No.: WO2018/168611
PCT Pub. Date: Sep. 20, 2018

(65) Prior Publication Data
US 2020/0347778 A1    Nov. 5, 2020

(30) Foreign Application Priority Data

Mar. 15, 2017   (JP) .................. 2017-049747

(51) Int. Cl.
*F02B 37/18*    (2006.01)
*F16B 43/00*    (2006.01)
(Continued)

(52) U.S. Cl.
CPC .............. *F02B 37/18* (2013.01); *F02B 39/00* (2013.01); *F16B 43/00* (2013.01); *F16K 1/20* (2013.01)

(58) Field of Classification Search
CPC .......... F02B 37/18; F02B 39/00; F16B 43/00; F16K 1/20
See application file for complete search history.

(56) References Cited

U.S. PATENT DOCUMENTS

2006/0213195 A1   9/2006  Leavesley
2007/0183867 A1   8/2007  Hesselmann et al.
(Continued)

FOREIGN PATENT DOCUMENTS

JP         10-30668 A    2/1998
JP      2000-291622 A   10/2000
(Continued)

OTHER PUBLICATIONS

International Search Report dated Apr. 17, 2018 in PCT/JP2018/008824, 1 page.

*Primary Examiner* — Audrey K Bradley
*Assistant Examiner* — Edward Bushard
(74) *Attorney, Agent, or Firm* — Oblon, McClelland, Maier & Neustadt, L.L.P.

(57) ABSTRACT

A wave washer according to an aspect of the present disclosure includes an annular body which is formed around an axis into a wave shape and at least one protruding piece which protrudes inward or outward from the body. The at least one protruding piece includes a flat surface which is perpendicular to the axis.

10 Claims, 14 Drawing Sheets

(51) Int. Cl.
*F02B 39/00* (2006.01)
*F16K 1/20* (2006.01)

(56) References Cited

U.S. PATENT DOCUMENTS

2014/0029884 A1 1/2014 Toyama et al.
2014/0366530 A1 12/2014 Murayama et al.

FOREIGN PATENT DOCUMENTS

| | | |
|---|---|---|
| JP | 2006-291782 A | 10/2006 |
| JP | 2007-198598 A | 8/2007 |
| JP | 2013-185552 A | 9/2013 |
| JP | 2014-27818 A | 2/2014 |
| JP | 2014-218945 A | 11/2014 |
| JP | 2015-197068 A | 11/2015 |
| JP | 2016-61310 A | 4/2016 |
| WO | WO 2005/071281 A1 | 8/2005 |

WAVE WASHER AND VARIABLE-FLOW-RATE VALVE

TECHNICAL FIELD

The present disclosure relates to a wave washer and a variable-flow-rate valve.

BACKGROUND ART

Conventionally, a wave washer or a spring washer described in Patent Documents 1 to 3 is known. The wave washer described in Patent Document 1 includes a plurality of arc-shaped pieces and a plurality of inward bent pieces connecting the arc-shaped pieces. The wave washer described in Patent Document 2 includes a waved ring-shaped washer body and three protrusion pieces formed on an inner periphery of the washer body. The three protrusion pieces are formed obliquely upward at the same angular intervals. A front end of each protrusion piece is formed with a large width and has a curved surface which closely follows an outer periphery of a mating shaft. The spring washer described in Patent Document 3 includes an annular outer body and a plurality of first and second finger portions which extend inward from the outer body. The first and second finger portions are alternately provided in a circumferential direction. The first finger portion extends in a first axial direction and the second finger portion extends in a second axial direction.

CITATION LIST

Patent Literature

Patent Document 1: Japanese Unexamined Patent Publication No. H10-30668
Patent Document 2: Japanese Unexamined Patent Publication No. 2000-291622
Patent Document 3: International Publication No. 2005/071281

SUMMARY OF INVENTION

Technical Problem

As described above, various washers are known from the past. However, the above-described conventional washers are easily worn away by contact with parts interposing the washer.

The present disclosure describes a wave washer capable of reducing wear due to contact with parts and a variable-flow-rate valve including the wave washer.

Solution to Problem

A wave washer according to an aspect of the present disclosure includes: an annular body which is formed around an axis into a wave shape; and at least one protruding piece which protrudes inward or outward from the body, in which the at least one protruding piece includes a flat surface which is perpendicular to the axis.

Effects of Invention

According to an aspect of the present disclosure, it is possible to reduce the wear of the wave washer due to contact with the parts. It is possible to reduce collision sound between the parts in the variable-flow-rate valve.

DESCRIPTION OF EMBODIMENTS

Figure 1:
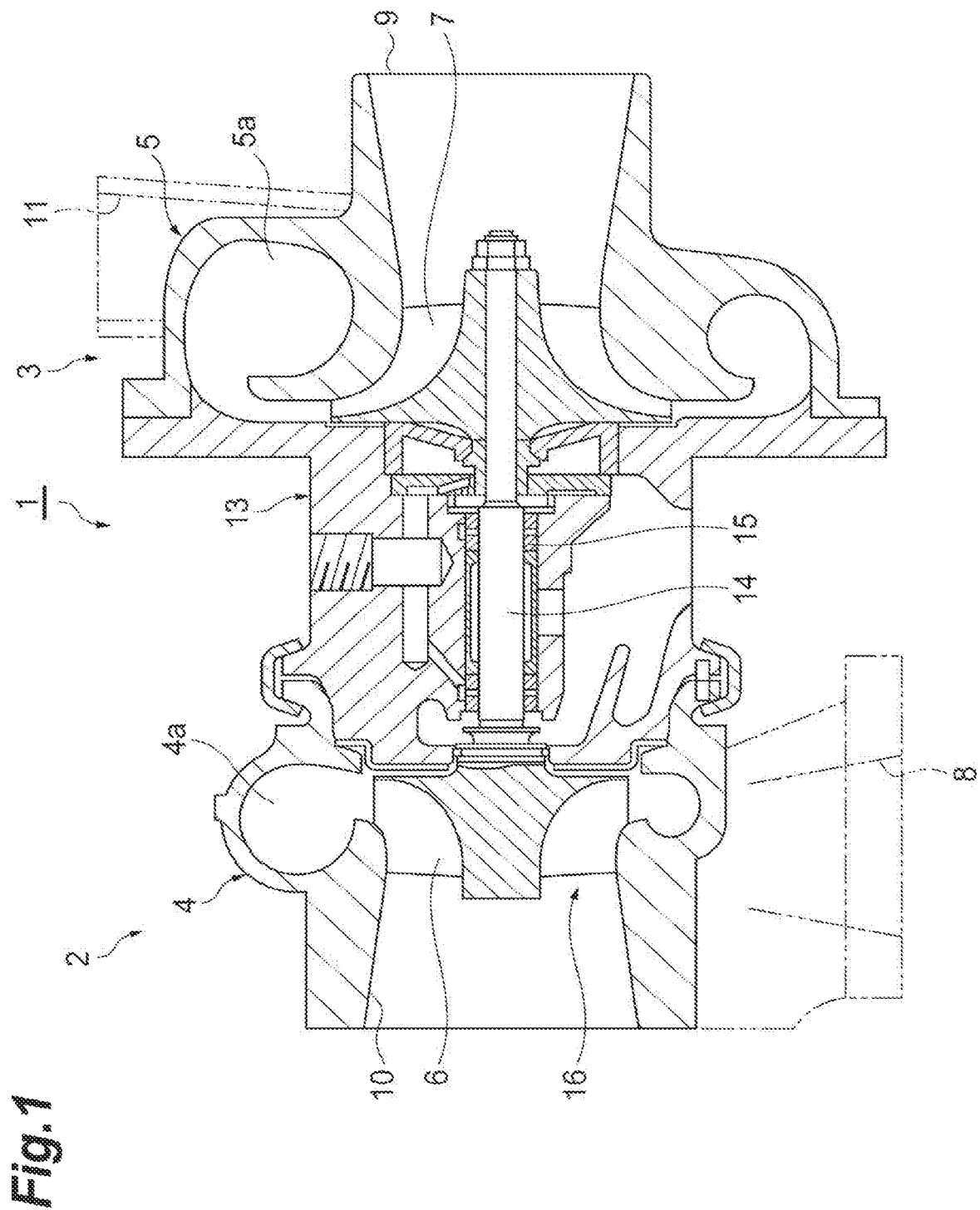
FIG. 1 is a cross-sectional view illustrating a turbocharger that employs a variable-flow-rate valve according to an embodiment.

A wave washer according to an aspect of the present disclosure includes: an annular body which is formed around an axis into a wave shape; and at least one protruding piece which protrudes inward or outward from the body, in which the at least one protruding piece includes a flat surface which is perpendicular to the axis.

According to this wave washer, any shaft member is inserted through the annular body. Some two parts are provided at both sides of the body in the axial direction. The wave washer is sandwiched between the two parts. The body which is formed in a wave shape has springiness and is deformed (contracted) in the axial direction while being disposed between two parts. At this time, the flat surface of the protruding piece can contact at least one part. Accordingly, the contact area between the wave washer and the part can be increased. An increase in contact area leads to a decrease in surface pressure as compared with the washer having the same inner and outer diameters. Accordingly, wear due to contact with parts can be reduced. In the past, the wear of the wave washer causes deterioration of springiness (for example, a tension, spring load, or the like), but according to the above-described wave washer, deterioration of springiness can also be suppressed since the wear is reduced.

In some aspects, the body includes a base portion to which the protruding piece is connected and the flat surface of the protruding piece and a front surface of the base portion are located on the same plane. In this case, not only the flat surface of the protruding piece but also the front surface of the base portion of the body contacts at least one part. When the flat front surface is also provided in the body in this way, the contact area between the wave washer and the part can be further increased. Additionally, the wave shape of the body can be formed in a region other than the base portion.

In some aspects, the body is formed in a wave shape between a first plane which is perpendicular to the axis and a second plane which is perpendicular to the axis and is separated from the first plane in the axial direction, and the at least one protruding piece includes at least one first protruding piece which extends along the first plane and includes the flat surface formed on a side opposite to the second plane in the axial direction and at least one second protruding piece which extends along the second plane and includes the flat surface formed on a side opposite to the first plane in the axial direction. In this case, the first protruding piece and the second protruding piece respectively including the flat surfaces following the parallel first and second planes are provided. The first protruding piece contacts the first part and the second protruding piece contacts the second part. Accordingly, since the wave washer contacts both of two parts in plane, the contact area between the wave washer and the part can be further increased. Two kinds of flat surfaces located at both end surfaces of the body in the axial direction reliably share a surface pressure transmitted from the part.

In some aspects, the first protruding piece and the second protruding piece are alternately arranged in the circumferential direction. In this case, the plurality of protruding pieces can be appropriately arranged in response to the wave shape of the body. The wave washer can uniformly contact two parts. A surface pressure which is applied to the plurality of flat surfaces can be also uniform in the circumferential direction.

In some aspects, the protruding piece includes a proximal portion which is connected to the body and extends in a radial direction of the body and a distal portion which is connected to the proximal portion, at least the distal portion is provided with the flat surface, and a width of the proximal portion in a direction perpendicular to both of the axis and the radius is smaller than a width of the distal portion. In this case, the contact area with the part can be increased by the distal portion provided with the flat surface. Since the width of the proximal portion is smaller than the width of the distal portion, the proximal portion hardly affects the shape of the body formed in a wave shape. In other words, a degree of freedom in design of the wave shape of the body can be increased.

In some aspects, the flat surface is formed over the entire region of the protruding piece. In this case, since the entire region of the protruding piece contacts at least one part, the contact area between the wave washer and the part can be further increased.

In some aspects, the protruding piece protrudes inward from the body. In this case, a configuration in which the shaft member comes into contact with the front end of the protruding piece can be provided. The protruding piece for increasing the contact area can be used as a positioning member.

A variable-flow-rate valve according to another aspect of the present disclosure includes: a valve body which opens and closes an opening portion of a gas flow rate variable passage formed in a housing; a stem which is supported by the housing to be rotatable while the valve body is connected to a first end thereof; a cylindrical bearing which is inserted through a through-hole of the housing and rotatably supports the stem; a link member that is connected to a second end of the stem protruding from an end surface of the housing of the bearing; and any one of the above-described wave washers which are disposed in a gap between the end surface of the bearing and the link member and through which the stem is inserted. In this case, the spring force of the wave washer can suppress the collision between the bearing and the link member. Accordingly, since the collision sound (impact sound) between the bearing and the link member in the variable-flow-rate valve is reduced, the noise generated from the turbocharger can be reduced. This can improve the marketability of the turbocharger.

A variable-flow-rate valve according to still another aspect of the present disclosure includes: a valve body which opens and closes an opening portion of a gas flow rate variable passage formed in a housing; an attachment member which includes a front end portion having the valve body attached thereto; a stem which is supported by the housing to be rotatable while a base end portion of the attachment member is connected to a first end thereof; a cylindrical bearing which is inserted through a through-hole of the housing and rotatably supports the stem; and any one of the above-described wave washers which are disposed in a gap between the base end portion of the attachment member and an end surface of the bearing inside the housing and through which the stem is inserted. In this case, the spring force of the wave washer can suppress the collision between the attachment member and the bearing. Accordingly, since the collision sound (impact sound) between the attachment member and the bearing in the variable-flow-rate valve is reduced, the noise generated from the turbocharger can be reduced. This can improve the marketability of the turbocharger.

A variable-flow-rate valve according to still another aspect of the present disclosure includes: a valve body which opens and closes an opening portion of a gas flow rate variable passage; a valve shaft which is provided in the valve body and protrudes toward a side opposite to the opening portion; an attachment member which includes a front end portion having the valve shaft inserted therethrough and having the valve body attached thereto; a clasp which is connected to an end portion opposite to the valve body in the valve shaft and protruding from the attachment member; and any one of the above-described wave washers which are disposed in a gap between the attachment member and the clasp and through which the valve shaft is inserted. In this case, the spring force of the wave washer can suppress the collision between the attachment member and the clasp. Accordingly, since the collision sound (impact sound) between the attachment member and the clasp in the variable-flow-rate valve is reduced, the noise generated from the turbocharger can be reduced. This can improve the marketability of the turbocharger.

A variable-flow-rate valve according to still another aspect of the present disclosure includes: a valve body which opens and closes an opening portion of a gas flow rate variable passage; a valve shaft which is provided in the valve body and protrudes toward the side opposite to the opening portion; an attachment member which includes a front end portion having the valve shaft inserted therethrough and having the valve body attached thereto; and any one of the above-described wave washers which are disposed in a gap between the valve body and the attachment member and through which the valve shaft is inserted. In this case, the spring force of the wave washer can suppress the collision between the valve body and the attachment member. Accordingly, since the collision sound (impact sound) between the valve body and the attachment member in the variable-flow-rate valve is reduced, the noise generated from the turbocharger can be reduced. This can improve the marketability of the turbocharger.

Hereinafter, embodiments of the present disclosure will be described with reference to the drawings. In addition, in the description of the drawings, the same reference numerals will be given to the same components and the repetitive description thereof will be omitted.

Figure 2:
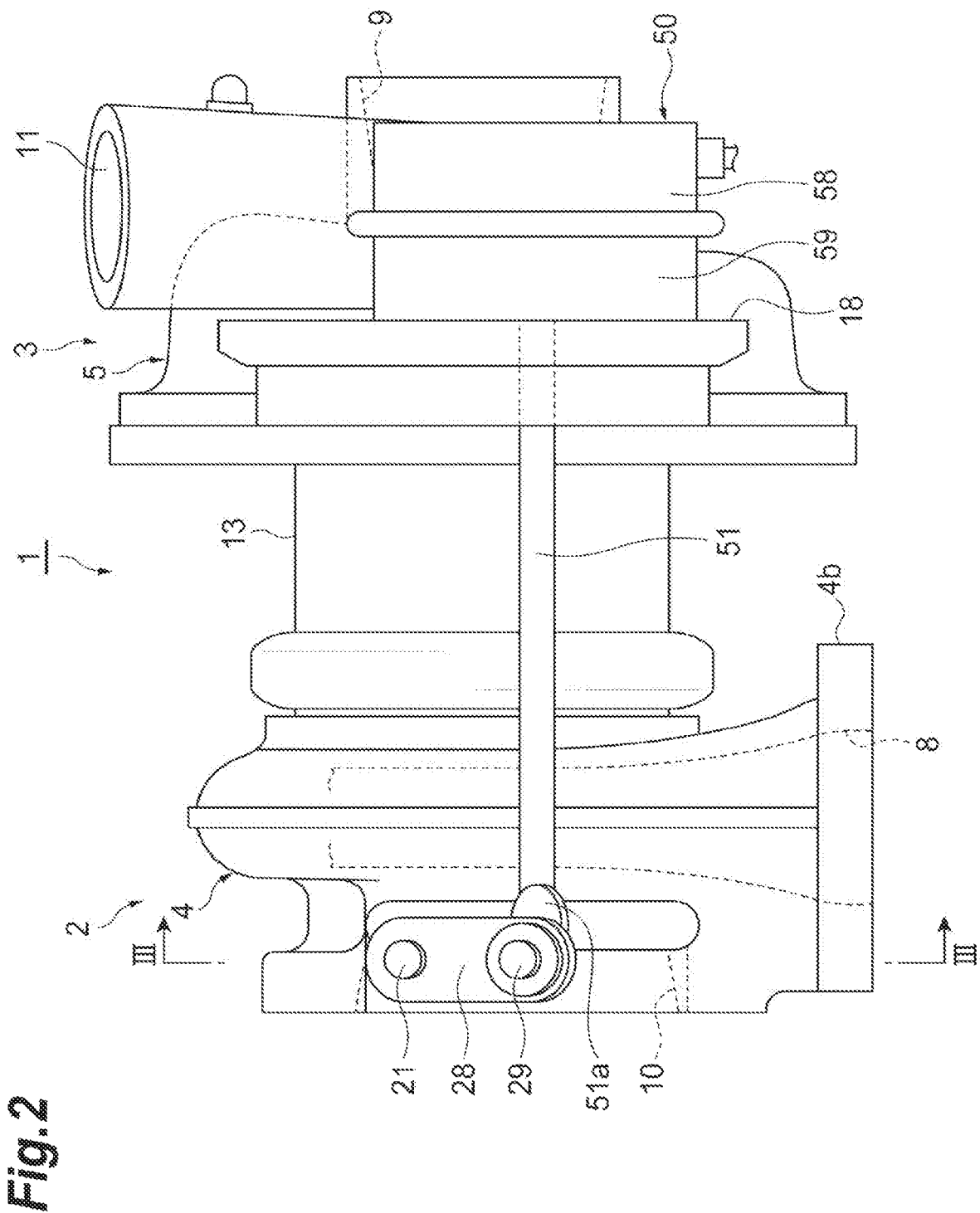
FIG. 2 is a side view illustrating the turbocharger of FIG. 1.
Figure 3:
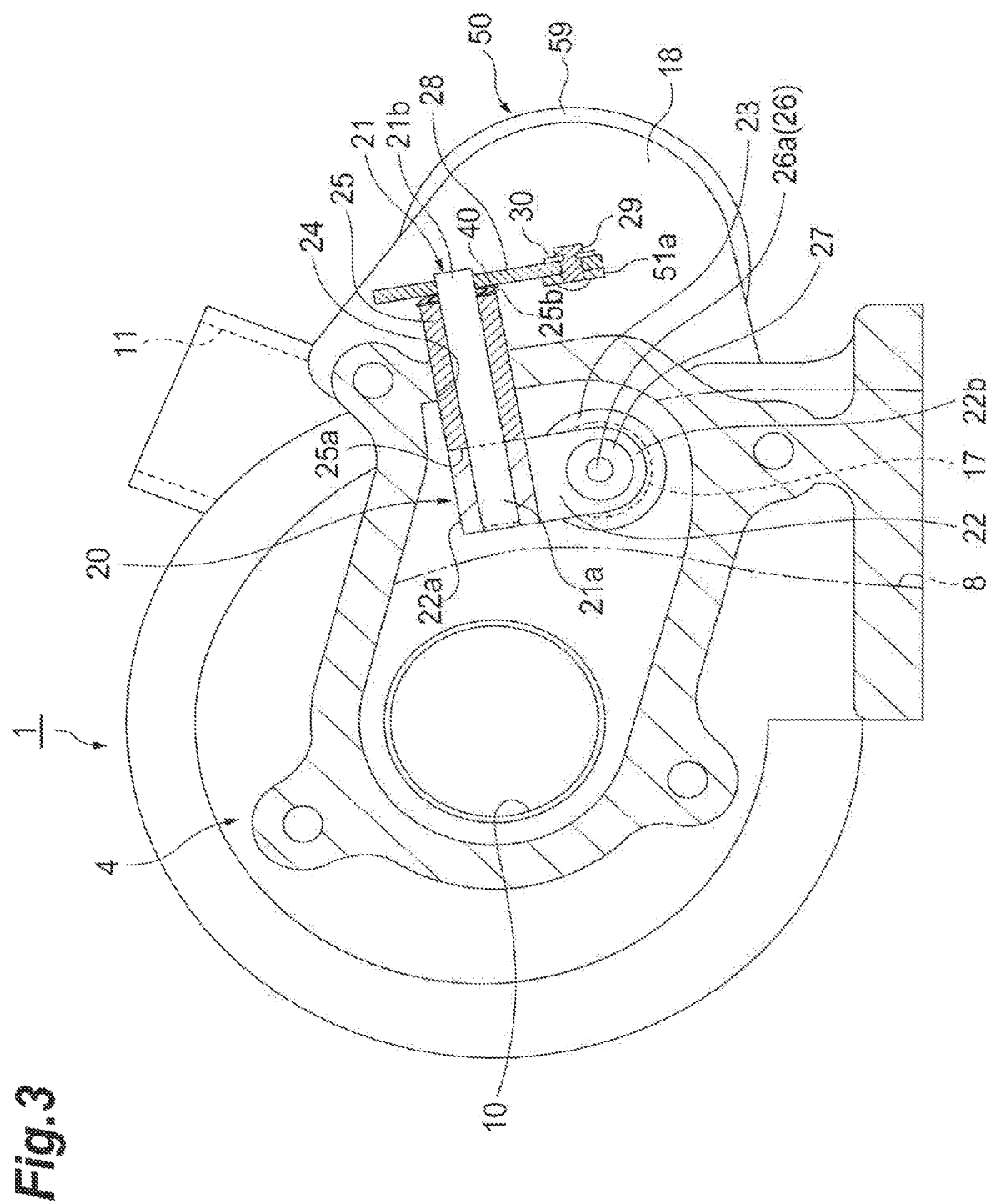
FIG. 3 is a cross-sectional view taken along a line III-III of FIG. 2.

A turbocharger 1 illustrated in FIGS. 1 to 3 is, for example, a vehicle turbocharger and is used to compress air supplied to an engine (not illustrated) by using an exhaust gas discharged from the engine. This turbocharger 1 includes a turbine 2 and a compressor 3. The turbine 2 includes a turbine housing 4 and a turbine impeller 6 accommodated in the turbine housing 4. The compressor 3 includes a compressor housing 5 and a compressor impeller 7 accommodated in the compressor housing 5.

The turbine impeller 6 is provided in a first end of a rotation shaft 14 and the compressor impeller 7 is provided in a second end of the rotation shaft 14. A bearing housing 13 is provided between the turbine housing 4 and the compressor housing 5. The rotation shaft 14 is rotatably supported by the bearing housing 13 through a bearing 15. The turbocharger 1 includes a turbine rotor shaft 16. This turbine rotor shaft 16 includes the rotation shaft 14 and the turbine impeller 6. The turbine rotor shaft 16 and the compressor impeller 7 rotate as an integrated rotation body.

The turbine housing 4 is provided with an exhaust gas inlet 8 and an exhaust gas outlet 10. An exhaust gas which is discharged from the engine flows into a turbine scroll passage 4a through the exhaust gas inlet 8 to rotate the turbine impeller 6 and then flows out of the turbine housing 4 through the exhaust gas outlet 10.

The compressor housing 5 is provided with a suction port 9 and a discharge port 11. When the turbine impeller 6 rotates as described above, the turbine rotor shaft 16 and the compressor impeller 7 rotate. The rotating compressor impeller 7 compresses air sucked from the suction port 9. The compressed air passes through the compressor scroll passage 5a and is discharged from the discharge port 11. The compressed air which is discharged from the discharge port 11 is supplied to the engine.

As illustrated in FIGS. 1 and 3, a bypass passage (see FIG. 3) 17 which leads a part of the exhaust gas introduced from the exhaust gas inlet 8 toward the exhaust gas outlet 10 while bypassing the turbine impeller 6 is formed inside the turbine housing 4. The bypass passage 17 is a gas flow rate variable passage which changes a flow rate of the exhaust gas supplied toward the turbine impeller 6.

As illustrated in FIG. 3, a waste gate valve 20 which is an example of a variable-flow-rate valve is provided inside the turbine housing 4. The waste gate valve 20 is provided to open and close an opening portion of the bypass passage 17. The waste gate valve 20 includes a stem 21 which is rotatably supported by an outer wall of the turbine housing 4, a valve attachment member 22 that protrudes from a first end 21a of the stem 21 in the radial direction of the stem 21, and a valve body 23 which is supported by a front end portion 22b of the valve attachment member 22.

The outer wall of the turbine housing 4 is provided with a support hole (a through-hole) 24 which penetrates the outer wall in a plate thickness direction. A cylindrical bearing 25 is inserted through the support hole 24. This bearing 25 is fixed to the outer wall of the turbine housing 4. The bearing 25 may have a uniform diameter from the first end to the second end in the axial direction. A first end surface 25a of the bearing 25 located inside the turbine housing 4 is formed to be flat. A second end surface 25b of the bearing 25 located outside the turbine housing 4 is formed to be flat. The shape of the bearing 25 is not particularly limited and may be any shape. The bearing 25 may include a small diameter portion which is formed near the first end inside the turbine housing 4 and a large diameter portion which is formed near the second end outside the turbine housing 4. The bearing 25 may include an inclined portion which increases in diameter from the first end to the second end.

The stem 21 is inserted through the bearing 25 and is rotatably supported by the outer wall of the turbine housing 4. The first end 21a which is disposed inside the turbine housing 4 in the stem 21 is inserted through a cylindrical portion which is formed in the base end portion 22a of the valve attachment member 22. The base end portion 22a of the valve attachment member 22 is bonded to the first end 21a of the stem 21 by welding or the like. An end surface near the cylindrical bearing 25 formed in the base end portion 22a of the valve attachment member 22 is parallel to the first end surface 25a of the bearing 25 and faces the first end surface 25a. The stem 21 rotates about the axis of the stem 21 to swing the valve attachment member 22. The front end portion 22b of the valve attachment member 22 is provided with an attachment hole for attaching the valve body 23.

The valve body 23 is able to contact and separate from the peripheral edge portion of the opening portion of the bypass passage 17 and has, for example, a disk shape. The valve body 23 is provided with a valve shaft 26 which protrudes toward a side opposite to the opening portion of the bypass passage 17. The valve shaft 26 is inserted through the attachment hole of the front end portion 22b of the valve attachment member 22. A clasp 27 is fixed to an end portion 26a opposite to the valve body 23 of the valve shaft 26 and the valve shaft 26 inserted through the attachment hole is held by the clasp 27. The valve body 23 is supported by the valve attachment member 22 so as to be slightly movable (tillable). Since the valve body 23 slightly moves with respect to the valve attachment member 22, the valve body 23 comes into close contact with the peripheral edge portion of the opening portion of the bypass passage 17. When the valve body 23 comes into contact with the peripheral edge portion of the opening portion of the bypass passage 17, the waste gate valve 20 is closed. When the valve body 23 is separated from the peripheral edge portion of the opening portion of the bypass passage 17, the waste gate valve 20 is opened.

Figure 5:
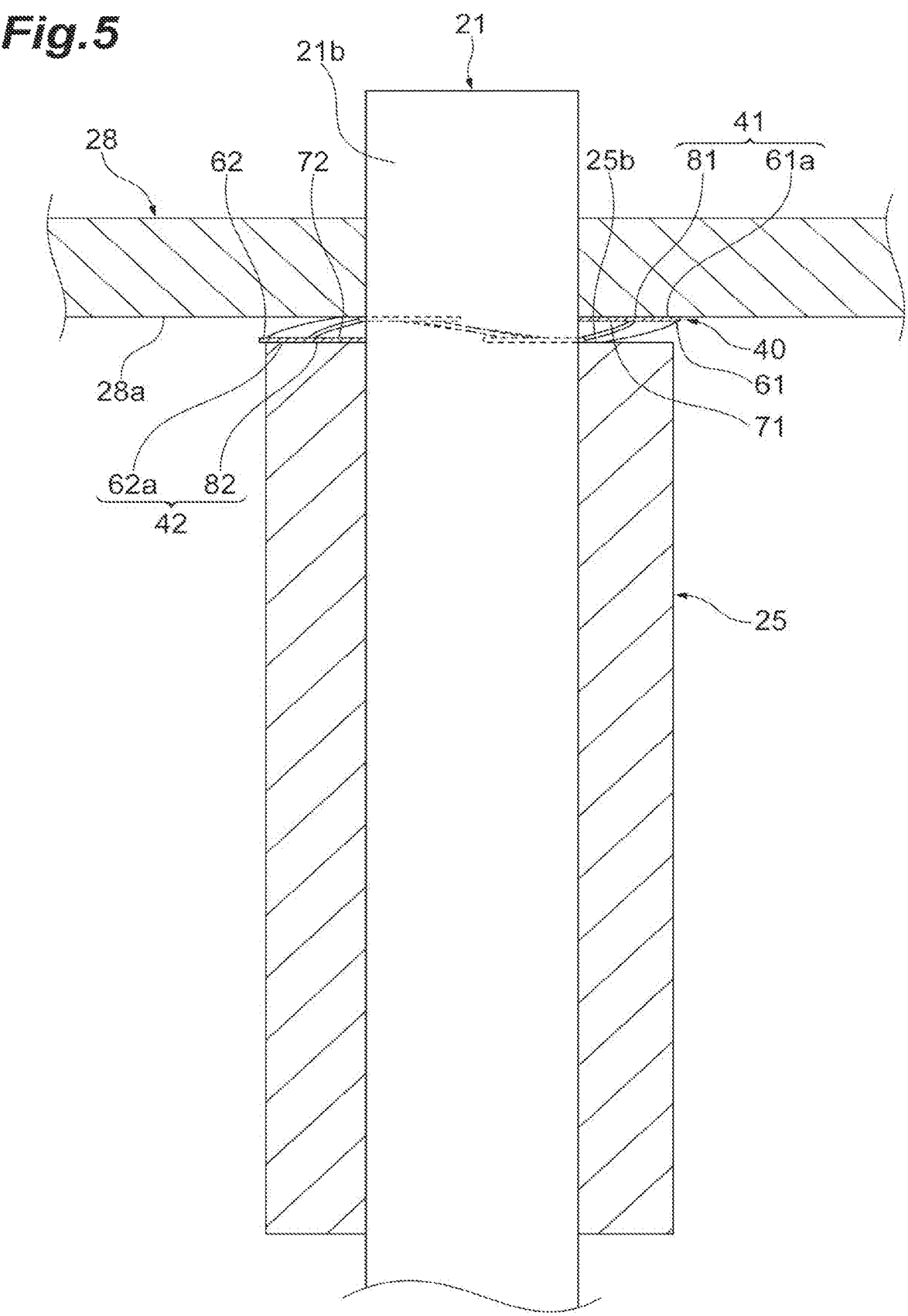
FIG. 5 is a partially enlarged view of FIG. 3.

As illustrated in FIGS. 3 and 5, a plate-shaped link member 28 which protrudes in the radial direction of the stem 21 is fixed to a second end 21b disposed outside the turbine housing 4 of the stem 21. The second end 21b of the stem 21 penetrates a through-hole formed in the link member 28. A rear surface 28a of the link member 28 is parallel to the second end surface 25b of the bearing 25 and faces the second end surface 25b.

The stem 21, the link member 28, the valve attachment member 22, and the valve body 23 are slightly movable in the axial direction of the stem 21 with respect to the bearing 25 fixed to the turbine housing 4. A gap (a clearance) can be formed between the rear surface 28a of the link member 28 and the second end surface 25b of the bearing 25 and/or a cylindrical end surface formed in the base end portion 22a of the valve attachment member 22 and the first end surface 25a of the bearing 25. The wave washer 40 of the embodiment is disposed in any gap. Alternatively, the wave washer 40 may be disposed in both gaps.

As illustrated in FIGS. 2 and 3, the front end portion of the link member 28 is provided with an attachment hole through which a connection pin 29 is inserted and the connection pin 29 is inserted through this attachment hole. Further, this connection pin 29 is inserted through an attachment hole formed in a front end portion 51a of an operation rod 51 of an actuator 50. A first end portion of the connection pin 29 is fixed to the operation rod 51 by caulking. A clip 30 is attached to a second end portion of the connection pin 29 so that the separation of the connection pin 29 from the attachment hole is prevented. The front end portion 51a of the operation rod 51 and the connection pin 29 are rotatable with respect to the link member 28. In accordance with the movement of the operation rod 51, a front end portion of the link member 28 swings about the axis of the stem 21. In other words, the stem 21 is connected to the operation rod 51 of the actuator 50 through the link member 28 and the connection pin 29.

The actuator 50 is fixed to a bracket 18 which protrudes laterally from the compressor housing 5. The actuator 50 includes, for example, the operation rod 51, a diaphragm which drives the operation rod 51, a low pressure chamber 59 and a high pressure chamber 58 which are adjacent to each other with the diaphragm interposed therebetween in the axial direction of the operation rod 51, and a return spring which is disposed inside the low pressure chamber 59 and urges the diaphragm. In the actuator 50, the operation rod 51 is moved to the front end side when the outlet side pressure of the compressor 3 reaches a predetermined pressure and the operation rod 51 is moved to the base end side when the outlet side pressure of the compressor 3 becomes smaller than the predetermined pressure.

At the time of use, the waste gate valve 20 is subjected to a treatment of preventing the generation of abnormal noise due to the collision of parts. As illustrated in FIG. 3, for example, the wave washer 40 is disposed between the rear surface 28a of the link member 28 and the second end surface 25b of the bearing 25. The second end 21b of the stem 21 is inserted through the wave washer 40. The wave washer 40 contacts the link member 28 and the bearing 25. The wave washer 40 has a spring force and applies a spring load to the link member 28 and the bearing 25. The wave washer 40 suppresses the collision of the link member 28 and the bearing 25. The wave washer 40 contacts each of the rear surface 28a of the link member 28 and the second end surface 25b of the bearing 25 while having a sufficient contact area. Accordingly, the wear of the wave washer 40 is reduced.

Figure 4:
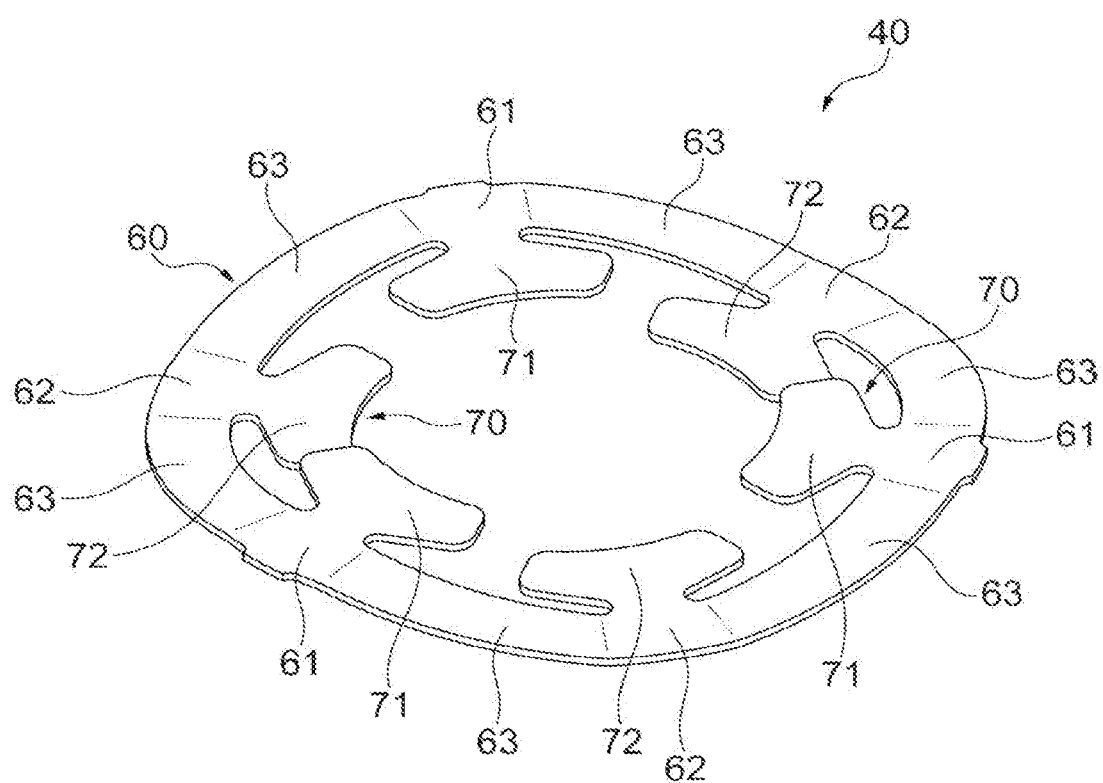
FIG. 4 is a perspective view illustrating a wave washer of FIG. 3.
Figure 7:
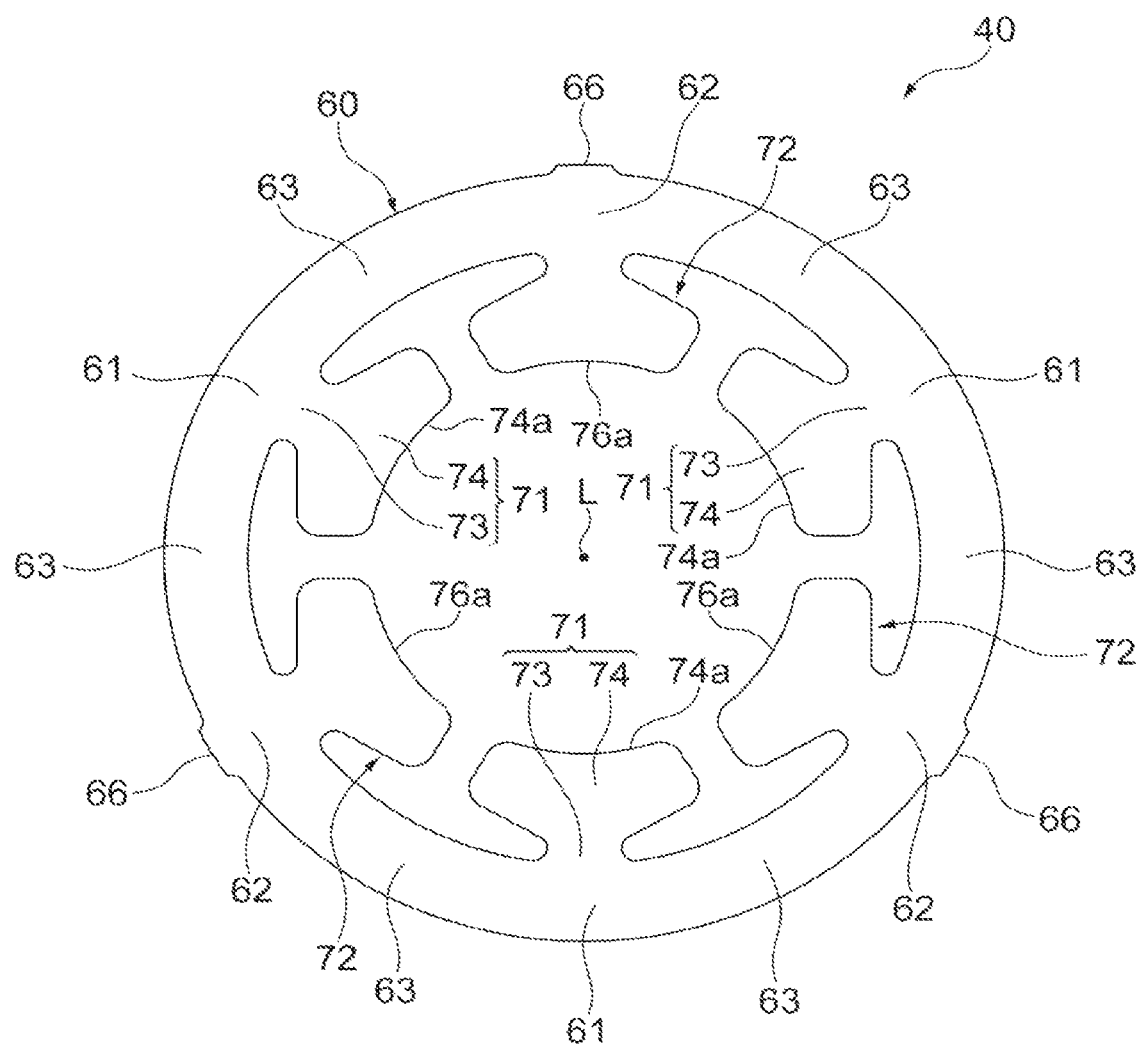
FIG. 7 is a front view of the wave washer of FIG. 4.

Referring to the drawings after FIG. 4, the wave washer 40 will be described in detail. As illustrated in FIGS. 4 and 7, the wave washer 40 includes an annular body 60 which has an axis L and a plurality of protruding piece 70 which protrude from the body 60 inward in the radial direction. The wave washer 40 is formed by, for example, a metallic thin plate. Additionally, a thin line illustrated in FIG. 4 is a line which indicates a shape of a three-dimensional surface.

Figure 9:
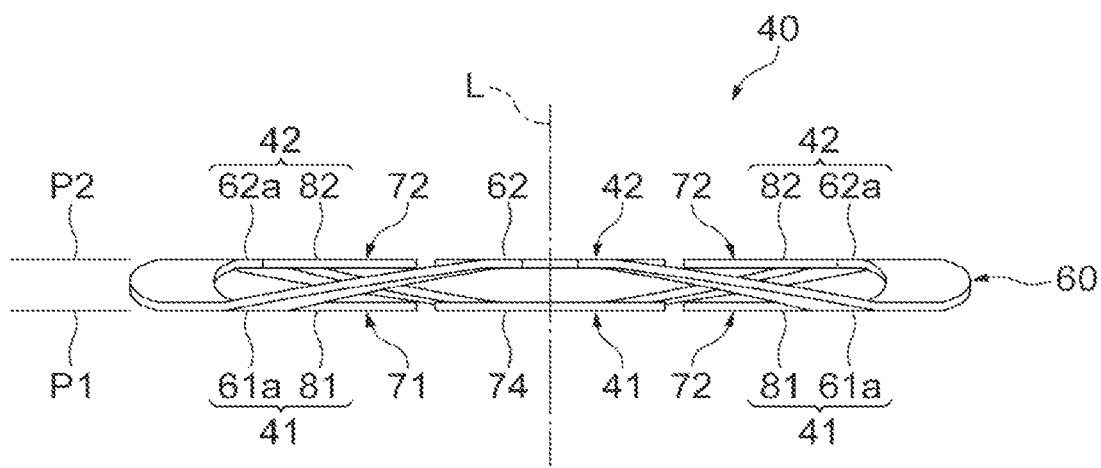
FIG. 9 is a plan view of the wave washer of FIG. 4.
Figure 10:
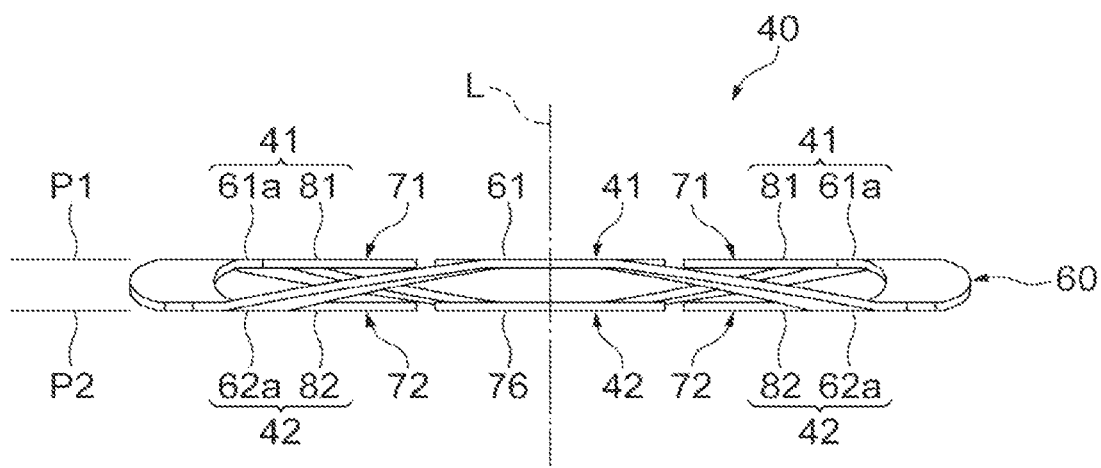
FIG. 10 is a bottom view of the wave washer of FIG. 4.
Figure 11:
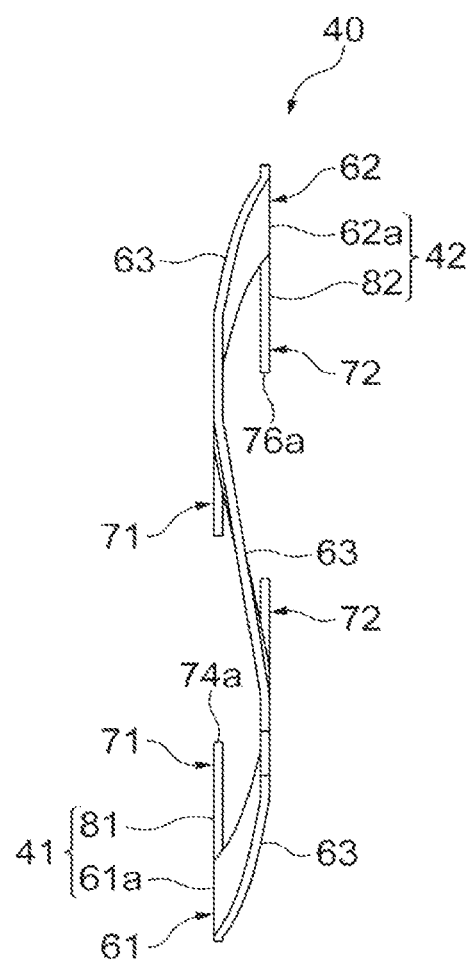
FIG. 11 is a right view of the wave washer of FIG. 4.
Figure 12:
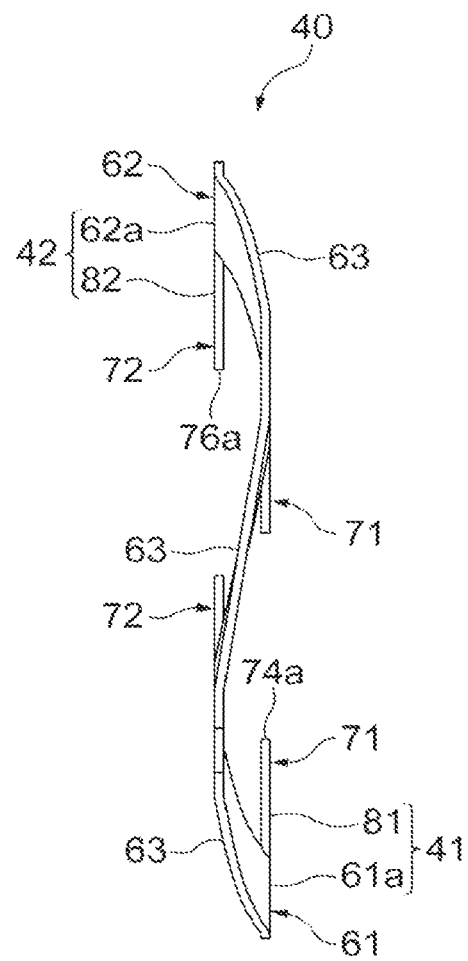
FIG. 12 is a left view of the wave washer of FIG. 4.

The annular body 60 is formed about the axis L. The body 60 is thin in the direction of the axis L and has a predetermined width in the radial direction perpendicular to the axis L. The body 60 is formed in a wave shape and has springiness. As illustrated in FIGS. 9 and 10, the body 60 is formed in a wave shape between a first plane P1 perpendicular to the axis L and a second plane P2 perpendicular to the axis L. The second plane P2 is separated from the first plane P1 in the direction of the axis L and is parallel to the first plane P1. By the first plane P1 and the second plane P2, the free length (the free height) of the wave washer 40 is defined.

As illustrated in FIGS. 4 and 7, the body 60 includes a first base portion 61 and a second base portion 62 to which the protruding piece 70 (a first protruding piece 71 or a second protruding piece 72 to be described later) is connected. For example, three first base portions 61 and three second base portions 62 are alternately arranged in the circumferential direction. Three first base portions 61 are arranged at the same intervals in the circumferential direction and three second base portions 62 are arranged at the same intervals in the circumferential direction. When viewed from the direction of the axis L, for example, the first base portion 61 and the second base portion 62 have the same shape and size. Three first base portions 61 and three second base portions 62 are arranged at the same intervals in the circumferential direction. A flat convex portion 66 may be formed on the outer peripheral side of each of three second base portions 62.

As illustrated in FIGS. 9 and 10, the first base portion 61 extends along the first plane P1. The second base portion 62 extends along the second plane P2. The first base portion 61 includes a first front surface 61a which extends along the first plane P1. The first front surface 61a is formed on the side opposite to the second plane P2 in the first base portion 61. The second base portion 62 includes a second front surface 62a which extends along the second plane P2. The second front surface 62a is formed on the side opposite to the first plane P1 in the second base portion 62.

As illustrated in FIGS. 4 and 7, an inclined portion 63 is formed between the first base portion 61 and the second base portion 62. The inclined portion 63 is connected to the first base portion 61 and the second base portion 62. The inclined portion 63 obliquely extends with respect to these planes between the first plane P1 and the second plane P2. The inclined portion 63 constitutes an inclined surface in the wave-shaped body 60. The inclined portion 63 may be a plane or a curved surface.

Additionally, the present disclosure is not limited to a case in which the body 60 is continuous over the entire circumference (360°). The body 60 may have a shape in which a part of the circumferential direction is interrupted. The body 60 may be formed in a substantially annular shape on the whole.

The protruding piece 70 includes the first protruding piece 71 connected to each first base portion 61 and the second protruding piece 72 connected to each second base portion 62. For example, three first protruding pieces 71 and three second protruding pieces 72 are alternately arranged in the circumferential direction. Three first protruding pieces 71 are arranged at the same intervals in the circumferential direction and three second protruding pieces 72 are arranged at the same intervals in the circumferential direction. When viewed from the direction of the axis L, for example, the first protruding piece 71 and the second protruding piece 72 have the same shape and size. Three first protruding pieces 71 and three second protruding pieces 72 are arranged at the same intervals in the circumferential direction.

The first protruding piece 71 and the second protruding piece 72 respectively protrude inward (inward in the radial direction), that is, toward the axis L from the body 60. A circular opening is formed by an inner end surface 74a of the first protruding piece 71 and an inner end surface 76a of the second protruding piece 72.

As illustrated in FIGS. 9 and 10, the first protruding piece 71 extends along the first plane P1. The second protruding piece 72 extends along the second plane P2. The first protruding piece 71 includes a first flat surface 81 extending along the first plane P1. The first flat surface 81 is formed on the side opposite to the second plane P2 in the first protruding piece 71. The second protruding piece 72 includes a second flat surface 82 extending along the second plane P2. The second flat surface 82 is formed on the side opposite to the first plane P1 in the second protruding piece 72.

The wave washer 40 includes a flat portion as wide as possible so as to increase the contact area with respect to both parts (the bearing 25 and the link member 28) in the direction of the axis L. Specifically, as illustrated in FIGS. 9 and 10, the first flat surface 81 of the first protruding piece 71 and the first front surface 61a of the first base portion 61 are located on the same plane. A first contact surface 41 corresponding to a continuous flat surface is formed by the first flat surface 81 and the first front surface 61a. The first contact surface 41 extends along the first plane P1. The second flat surface 82 of the second protruding piece 72 and the second front surface 62a of the second base portion 62 are located on the same plane. A second contact surface 42 corresponding to a continuous flat surface is formed by the second flat surface 82 and the second front surface 62a (see a diagonal line part of FIG. 13). The second contact surface 42 extends along the second plane P2.

Figure 6:
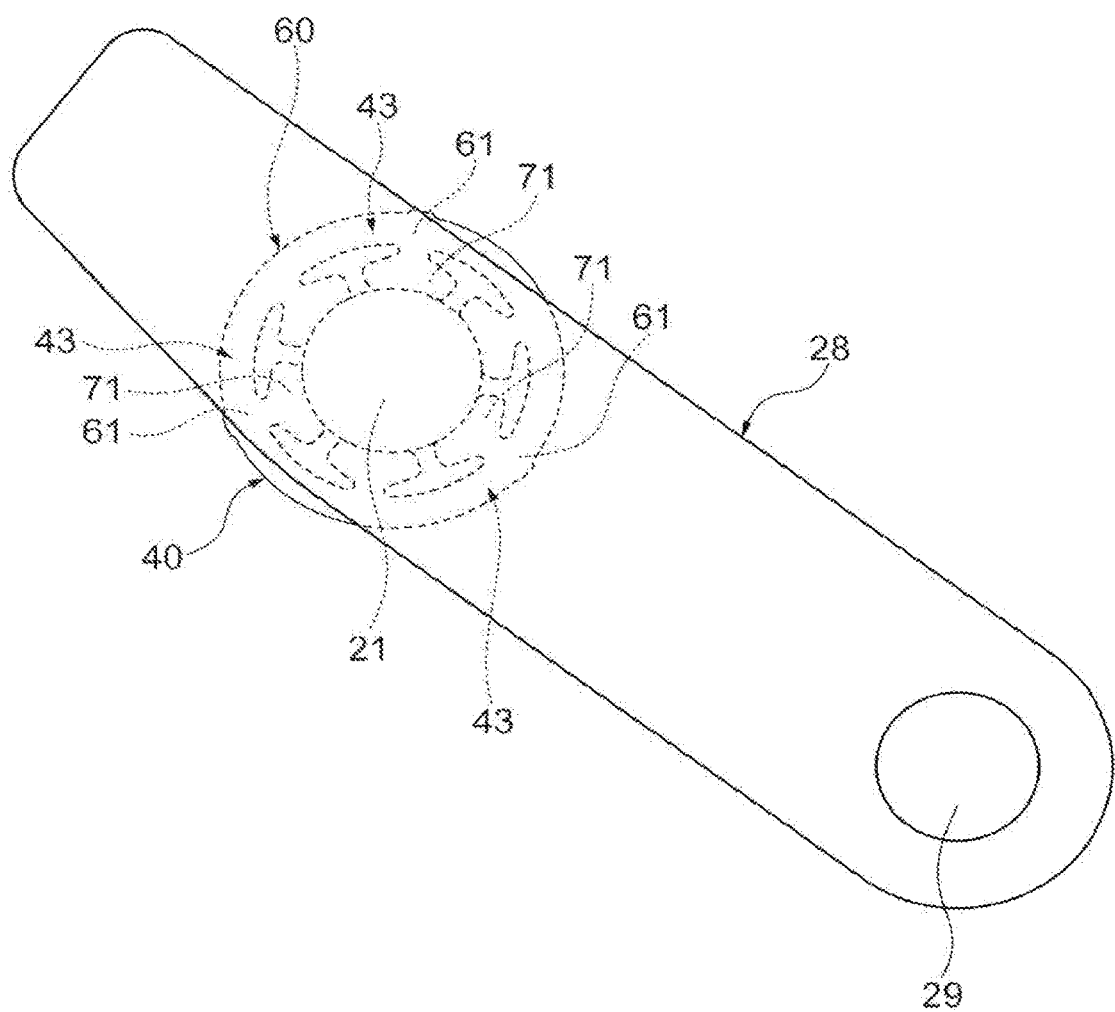
FIG. 6 is a diagram illustrating a positional relationship of the wave washer with respect to a link member.

As illustrated in FIG. 5, the wave washer 40 is compressed (collapsed) more than its free length while being sandwiched between the link member 28 and the bearing 25. In this state, for example, the first contact surface 41 contacts the rear surface 28a of the link member 28 and the second contact surface 42 contacts the second end surface 25b of the bearing 25. As illustrated in FIG. 6, the link member 28 has a width corresponding to the diameter of the body 60 and contacts most of the part near the first plane P1 in the wave washer 40. In a state in which the wave washer 40 is compressed, the diameter of the body 60 may be slightly larger than the diameter of the second end surface 25b or may be substantially the same as the diameter of the second end surface 25b. The second end surface 25b contacts most of the part near the second plane P2 in the wave washer 40.

As described above, the first flat surface 81 is provided over the entire region of the first protruding piece 71 and the second flat surface 82 is provided over the entire region of the second protruding piece 72. Then, since the first flat surface 81 and the second flat surface 82 are respectively located on the same planes as those of the first front surface 61a and the second front surface 62a, the area of the flat portion (that is, the first contact surface 41 and the second contact surface 42) increases.

Figure 8:
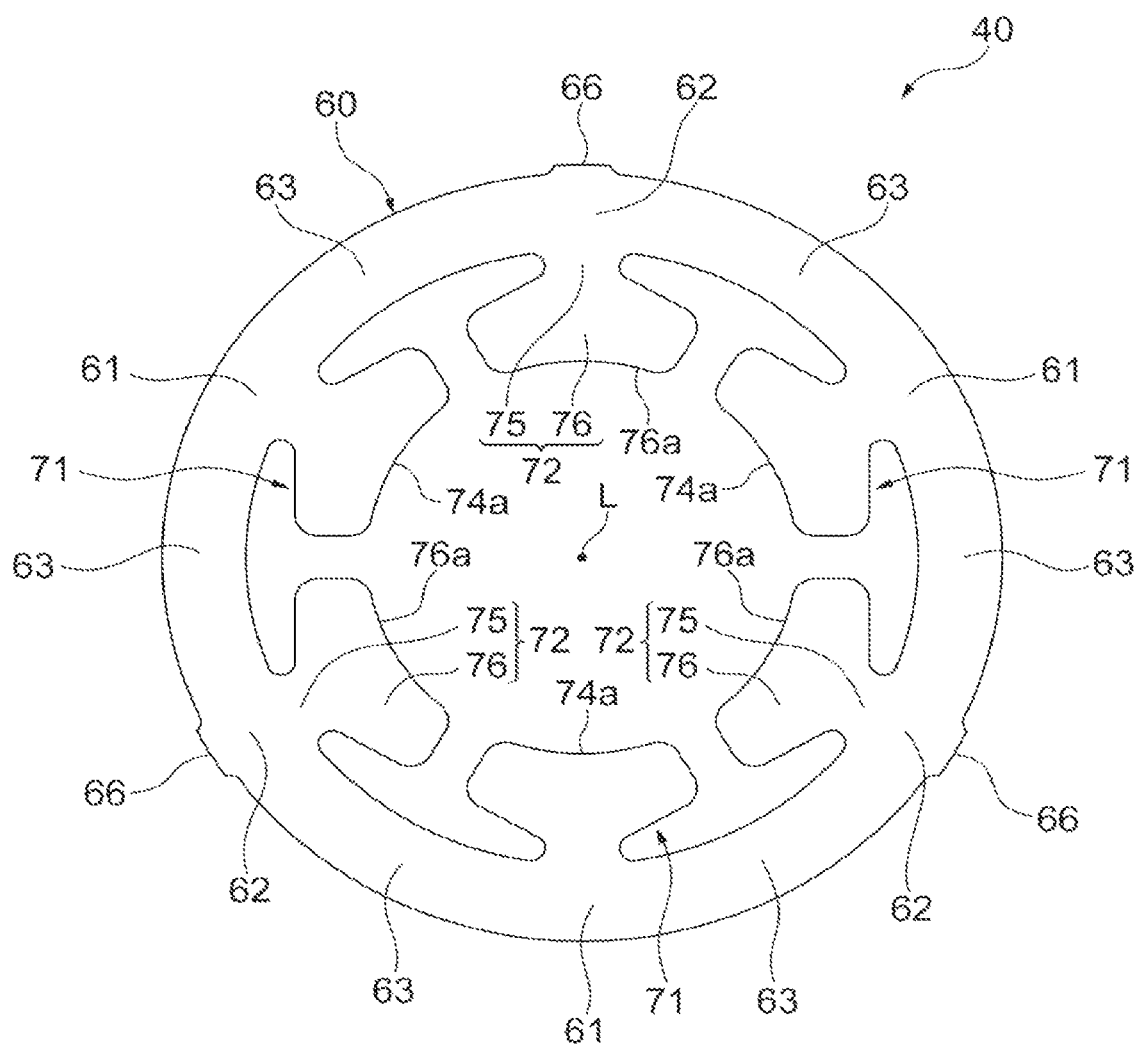
FIG. 8 is a rear view of the wave washer of FIG. 4.

Referring to FIGS. 7 and 8, the first protruding piece 71 and the second protruding piece 72 will be described in more detail. The first protruding piece 71 includes a first proximal portion 73 which is connected to the first base portion 61 and extends inward (inward in the radial direction) and a first distal portion 74 which is connected to the inside of the first proximal portion 73. The first proximal portion 73 extends along the radial direction of the body 60. The first distal portion 74 protrudes toward both sides in the circumferential direction with respect to the first proximal portion 73. The second protruding piece 72 includes a second proximal portion 75 which is connected to the second base portion 62 and extends inward (inward in the radial direction) and a second distal portion 76 which is connected to the inside of the second proximal portion 75. The second proximal portion 75 extends along the radial direction of the body 60. The second distal portion 76 protrudes toward both sides in the circumferential direction with respect to the second proximal portion 75.

As illustrated in FIGS. 7, 8, 11, and 12, the front end of the first distal portion 74 of the first protruding piece 71 is provided with the above-described inner end surface 74a. The front end of the second distal portion 76 of the second protruding piece 72 is provided with the above-described inner end surface 76a. Each of the inner end surface 74a and the inner end surface 76a has a concave shape corresponding to a part of a circular arc shape. By the inner end surface 74a of the first protruding piece 71 and the inner end surface 76a of the second protruding piece 72, for example, a circular non-continuous inner peripheral surface is formed along the second end 21b (the shaft member) of the stem 21. For example, the second end 21b (the shaft member) of the stem 21 is inserted through an opening formed by the inner end surface 74a and the inner end surface 76a.

The position of the wave washer 40 with respect to the stem 21 in the radial direction may be determined (that is, maintained) in such a manner that the inner end surface 74a and/or the inner end surface 76a comes into contact with the stem 21. A gap may be formed between the inner end surface 74a and/or the inner end surface 76a and the stem 21 in the radial direction. The gap in the radial direction allows an appropriate collapse of the wave washer 40. The axis L of the wave washer 40 can be substantially the same as the axis of the stem 21.

Figure 13:
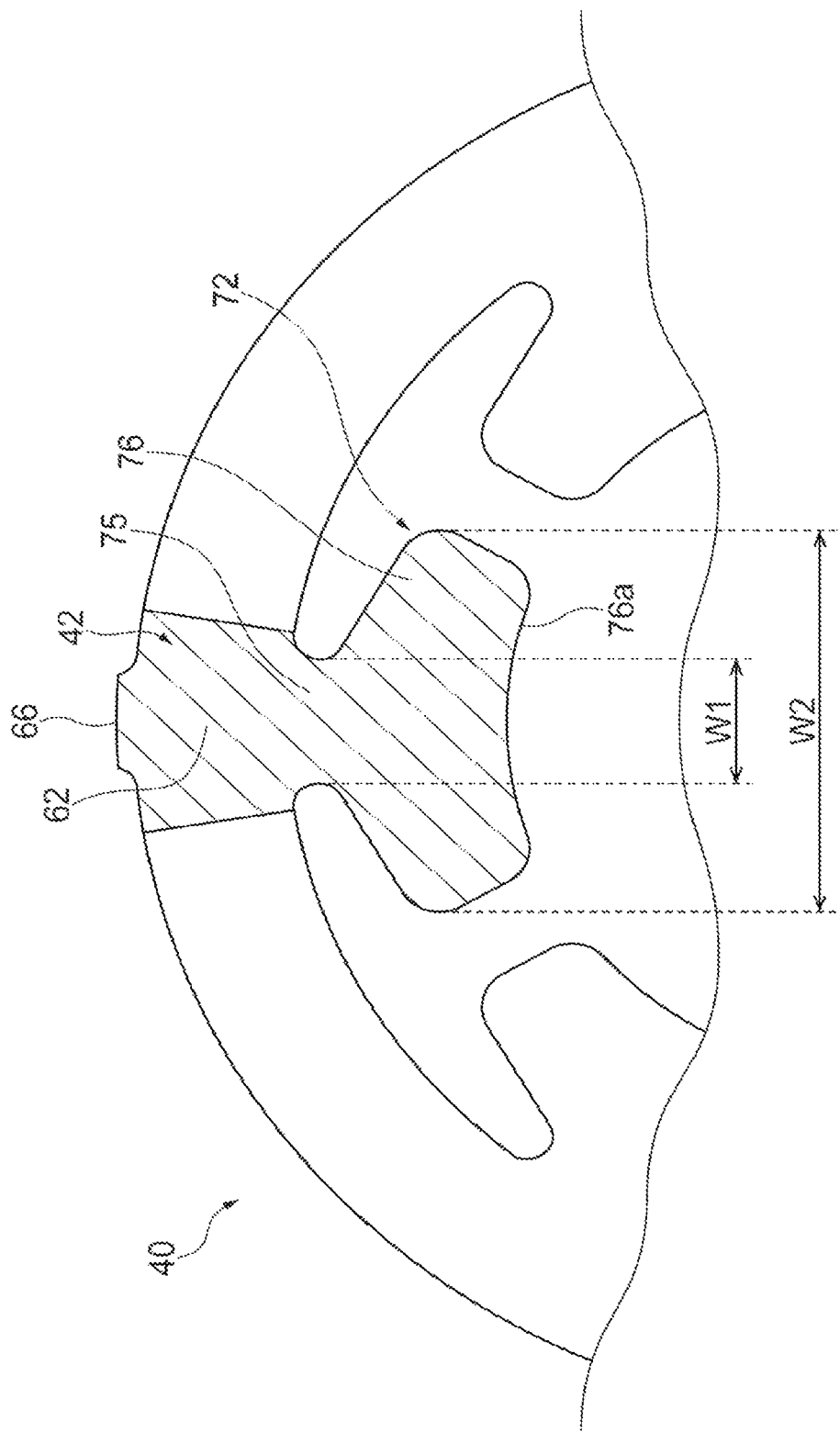
FIG. 13 is a partially enlarged view of FIG. 7.

As illustrated in FIG. 13, a width W1 of the second proximal portion 75 is smaller than a width W2 of the second distal portion 76. Here, the "width" means the size in a direction perpendicular to both of the axis L and the radius passing through the center of the second proximal portion 75. Additionally, the same relationship (the width W1<the width W2) is also established in the first proximal portion 73 and the first distal portion 74 of the first protruding piece 71. Since the width W1 of the second distal portion 76 is small in this way, the circumferential length of the inclined portion 63 of the body 60 can be increased. As a result, since a free length (a distance between the first plane P1 and the second plane P2) caused by the inclined portion 63 can be sufficiently ensured, a wave shape realizing a desired spring load can be formed. Additionally, in FIG. 13, a flat portion relating to the second protruding piece 72 is indicated by a diagonal line. When the convex portion 66 is formed on the outer peripheral side of the second base portion 62, the area of the second contact surface 42 becomes larger than the area of the first contact surface 41 by the area of the convex portion 66.

According to the wave washer 40, the stem 21 corresponding to a shaft member is inserted through the annular body 60. The link member 28 and the bearing 25 exist at both sides of the body 60 in the direction of the axis L. The wave washer 40 is sandwiched by these two parts. The body 60 formed in a wave shape has springiness and is deformed (contracted) in the direction of the axis L while being disposed between two parts. At this time, the first flat surface 81 of the first protruding piece 71 and the second flat surface 82 of the second protruding piece 72 can respectively contact the link member 28 and the bearing 25 (see FIG. 5). Accordingly, the contact area between the wave washer 40 and the part can be increased. An increase in contact area causes a decrease in surface pressure as compared with the washer having the same inner and outer diameters. Accordingly, wear due to contact with the part can be reduced.

Conventionally, since the contact area of the wave washer with respect to the part was not sufficient, there was a tendency that the wave washer was worn away and collapsed. The wear of such a wave washer caused deterioration of springiness (for example, a tension, spring load, or the like). According to the wave washer 40 of the embodiment, since wear is reduced, deterioration of springiness can also be suppressed.

As illustrated in FIG. 6, in the wave washer 40 which is deformed while being sandwiched between the link member 28 and the bearing 25, for example, a part of the inclined portion 63 close to the first base portion 61 or the second base portion 62 in the body 60 contacts the link member 28 (or the bearing 25). Thus, since a wider enlarged contact surface 43 which is expanded in the circumferential direction is formed, an advantageous configuration is realized in terms of the above-described wear reduction.

The body 60 is also provided with the flat first and second front surfaces 61a and 62a and the first front surface 61a and the second front surface 62a are respectively located on the same plane as that of the first flat surface 81 and the second flat surface 82. The first front surface 61a and the second front surface 62a of the body 60 also contact the link member 28 and the bearing 25. Accordingly, the contact area between the wave washer 40 and the part can be further increased.

The first protruding piece 71 and the second protruding piece 72 respectively include the first flat surface 81 following the first plane P1 and the second flat surface 82 following the second plane P2. The first protruding piece 71 contacts the link member 28 and the second protruding piece 72 contacts the bearing 25. Accordingly, since the wave washer 40 contacts both of two parts in plane, the contact area between the wave washer 40 and the part can be further increased. Two kinds of flat surfaces (the first flat surface 81 and the second flat surface 82) located at both end surfaces of the body 60 in the direction of the axis L reliably share a surface pressure transmitted from the part.

According to the first protruding piece 71 and the second protruding piece 72 which are alternately arranged, the plurality of protruding pieces can be appropriately arranged in response to the wave shape of the body 60. The wave washer 40 can be uniformly brought into contact with two parts. A surface pressure which is applied to the plurality of flat surfaces (the first flat surface 81 and the second flat surface 82) can also be uniform in the circumferential direction.

As described above, since the width W1 is smaller than the width W2, the contact area with the part can be increased by the distal portion (the first distal portion 74 or the second distal portion 76) provided with the flat surface. Since the width W1 of the proximal portion (the first proximal portion 73 or the second proximal portion 75) is smaller than the width W2 of the distal portion (the first distal portion 74 or the second distal portion 76), the proximal portion hardly affects the shape of the body 60 formed in a wave shape. In other words, a degree of freedom in design of the wave shape of the body 60 is increased.

The flat surface (the first flat surface 81 or the second flat surface 82) is provided in the entire region of the protruding piece (the first protruding piece 71 or the second protruding piece 72). In this case, since the entire region of the protruding piece contacts at least one part, the contact area between the wave washer 40 and the part can be further increased.

The protruding piece (the first protruding piece 71 or the second protruding piece 72) protrudes inward from the body 60. In this case, a configuration in which a shaft member such as the stem 21 comes into contact with the front end of the protruding piece can be provided. The protruding piece for increasing the contact area can be used as a positioning member.

In the waste gate valve 20 of the turbocharger 1, the spring force of the wave washer 40 can suppress the collision between the bearing 25 and the link member 28. Accordingly, since the collision sound (impact sound) between the bearing 25 and the link member 28 is reduced, the noise generated from the turbocharger 1 can be reduced. This can improve the marketability of the turbocharger 1. In the past, impact sound was generated when the bearing 25 and the link member 28 collided with each other through the clearance, but this problem is solved.

As described above, an embodiment of the present disclosure has been described, but the present disclosure is not limited to the above-described embodiment.

For example, as another aspect, the waste gate valve 20 in which the wave washer 40 is disposed in a gap between the base end portion 22a (see FIG. 3) of the valve attachment member 22 and the first end surface 25a inside the housing of the bearing 25 and the first end 21a of the stem 21 is inserted through the wave washer 40 may be provided. In this case, the spring force of the wave washer 40 can suppress the collision between the valve attachment member 22 and the bearing 25. Accordingly, since the collision sound (impact sound) between the valve attachment member 22 and the bearing 25 in the waste gate valve 20 is reduced, the noise generated from the turbocharger 1 can be reduced. This can improve the marketability of the turbocharger 1.

As another aspect, the waste gate valve 20 in which the wave washer 40 is disposed in a gap between the valve attachment member 22 and the clasp 27 and the valve shaft 26 is inserted through the wave washer 40 may be provided. In this case, the spring force of the wave washer 40 can suppress the collision between the valve attachment member 22 and the clasp 27. Accordingly, since the collision sound (impact sound) between the valve attachment member 22 and the clasp 27 in the waste gate valve 20 is reduced, the noise generated from the turbocharger 1 can be reduced. This can improve the marketability of the turbocharger 1.

As another aspect, the waste gate valve 20 in which the wave washer 40 is disposed in a gap between the valve body 23 and the valve attachment member 22 and the valve shaft 26 is inserted through the wave washer 40 may be provided. In this case, the spring force of the wave washer 40 can suppress the collision between the valve body 23 and the valve attachment member 22. Accordingly, since the collision sound (impact sound) between the valve body 23 and the valve attachment member 22 in the waste gate valve 20 is reduced, the noise generated from the turbocharger 1 can be reduced. This can improve the marketability of the turbocharger 1.

Further, the installation position of the wave washer 40 is not limited to one position. Any two to four of the installation position in the above-described embodiment (the aspect illustrated in FIG. 3) and the installation positions of the above-described three aspects may be appropriately combined. That is, the wave washer 40 can be provided at one position, two positions, three positions, or four positions of the waste gate valve 20.

Figure 14:
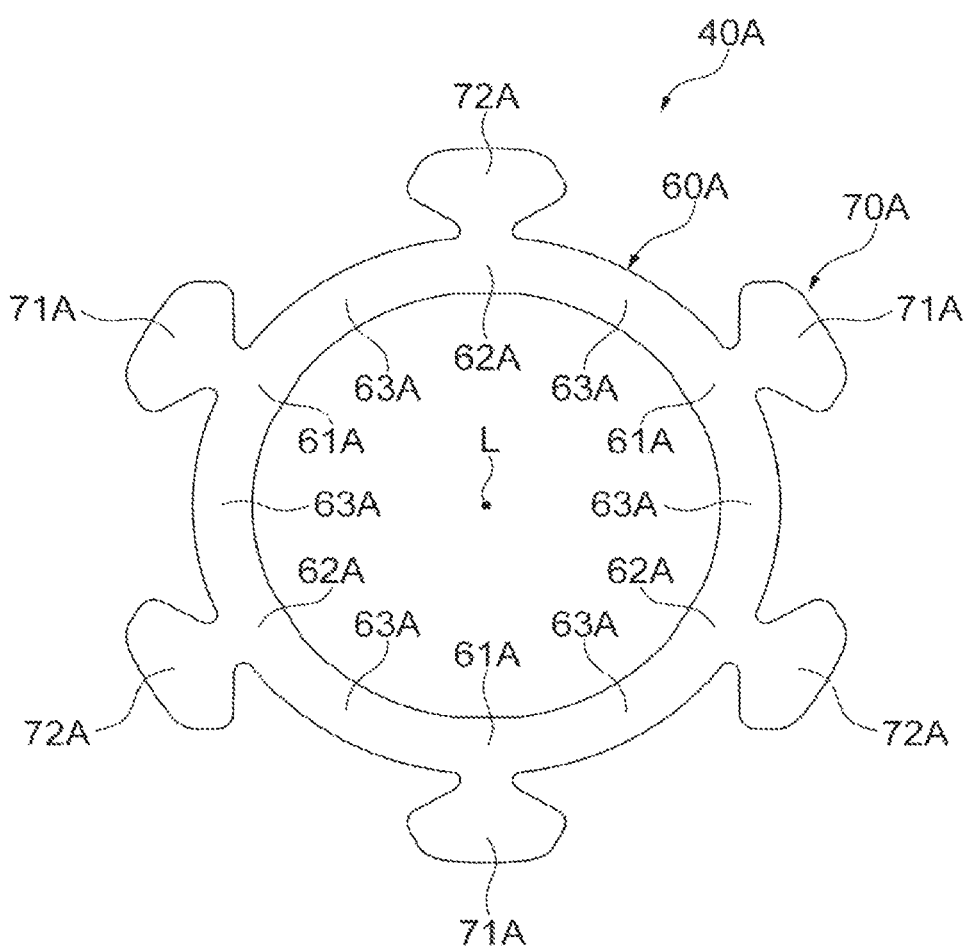
FIG. 14 is a front view illustrating a wave washer according to another embodiment.

As still another aspect, as illustrated in FIG. 14, a wave washer 40A which includes an annular body 60A formed in a wave shape and a plurality of protruding pieces 70A (a first protruding piece 71A and a second protruding piece 72A) protruding from the body 60A outward in the radial direction may be provided. A shaft member can be inserted through the body 60A. Also in the wave washer 40A, the body 60A can include a plurality of first base portions 61A, a plurality of second base portions 62A, and a plurality of inclined portions 63A. A positional relationship of the first base portion 61A and the first protruding piece 71A with respect to the first plane P1 or a positional relationship of the second base portion 62A and the second protruding piece 72A with respect to the second plane P2 may be the same as that of the above-described embodiment. Since the flat surface is provided in the first protruding piece 71A and the second protruding piece 72A protruding outward in the radial direction, the contact area can be increased. Similarly to the above-described embodiments, the wear is reduced and the collision sound of the waste gate valve 20 is reduced.

Further, the flat surface may be provided only in a part of the region of the protruding piece. For example, the flat surface may be provided only in the distal portion of the protruding piece. The proximal portion of the protruding piece may not be flat. That is, the proximal portion may not follow a plane perpendicular to the axis L. The flat surface provided in a part (the distal portion or the like) of the protruding piece and the base portion of the body may constitute two separate contact surfaces. In that case, for example, the proximal portion of the protruding piece is not included in the contact surface. The protruding piece may not be provided with the proximal portion having a thin width. The wave washer may include a protruding piece having a substantially uniform width. The wave washer may include a protruding piece of which a width decreases as it goes inward in the radial direction. In that case, the area of the protruding piece may be smaller than the area of the base portion. A pair of sides of the protruding piece extending from the base portion may have a linear shape extending in the radial direction (toward the axis L).

Each of the number of the first protruding pieces 71 and the number of the second protruding pieces 72 may not be three. Each of the number of the first protruding pieces 71 and the number of the second protruding pieces 72 may be four or more or two or more. The first protruding piece and the second protruding piece may not be alternately arranged in the circumferential direction. The plurality of first protruding pieces may be arranged at intervals in the circumferential direction and the plurality of second protruding pieces may be arranged at intervals in the circumferential direction so as to be adjacent to them. Each of the first protruding piece and the second protruding piece may be provided at one position. In this case, the first protruding piece and the second protruding piece may be disposed at positions shifted by 180°.

The protruding piece may be provided between the first plane and the second plane (within the range of the free height of the body) in the axial direction. The base portion of the body may not be flat. A part of the base portion may be formed as an inclined portion. Even when the base portion of the body is flat, the base portion may not be located on the same plane as that of the flat surface of the protruding piece. The body may be provided with only one protruding piece. The wave shape of the body can be appropriately changed.

INDUSTRIAL APPLICABILITY

According to some aspects of the present disclosure, it is possible to reduce the wear of the wave washer due to contact with the parts. It is possible to reduce the collision sound between the parts in the variable-flow-rate valve.

REFERENCE SIGNS LIST

1: turbocharger, 20: waste gate valve (variable-flow-rate valve), 21: stem, 22: valve attachment member (attachment member), 23: valve body, 25: bearing, 26: valve shaft, 27: clasp, 28: link member, 40, 40A: wave washer, 41: first contact surface, 42: second contact surface, 60, 60A: body, 61, 61A: first base portion (base portion), Ma: first front surface (front surface), 62, 62A: second base portion (base portion), 62a: second front surface (front surface), 70, 70A: protruding piece, 71, 71A: first protruding piece (protruding piece), 72, 72A: second protruding piece (protruding piece), 73: first proximal portion (proximal portion), 74: first distal portion (distal portion), 75: second proximal portion (proximal portion), 76: second distal portion (distal portion), 81: first flat surface (flat surface), 82: second flat surface (flat surface), L: axis, W1: width (width of proximal portion), W2: width (width of distal portion).

The invention claimed is:

1. A wave washer comprising:
   an annular body which is formed around an axis into a wave shape; and
   at least one protruding piece which protrudes inward or outward from the body, wherein the at least one protruding piece includes a flat surface which is perpendicular to the axis
   wherein the wave shape is formed between a first plane which is perpendicular to the axis and a second plane which is perpendicular to the axis and is separated from the first plane in the axial direction, and
   wherein the at least one protruding piece includes at least one first protruding piece which extends along the first plane and includes the flat surface formed on a side opposite to the second plane in the axial direction and at least one second protruding piece which extends along the second plane and includes the flat surface formed on a side opposite to the first plane in the axial direction.

2. The wave washer according to claim 1,
   wherein the body includes a base portion to which the protruding piece is connected, and
   wherein the flat surface of the protruding piece and a front surface of the base portion are located on the same plane.

3. The wave washer according to claim 1,
   wherein the first protruding piece and the second protruding piece are alternately arranged in the circumferential direction.

4. The wave washer according to claim 1,
   wherein the protruding piece includes a proximal portion which is connected to the body and extends along the radial direction of the body and a distal portion which is connected to the proximal portion,
   wherein at least the distal portion is provided with the flat surface, and
   wherein a width of the proximal portion in a direction perpendicular to both of the axis and the radius is smaller than a width of the distal portion.

5. The wave washer according to claim 1,
   wherein the flat surface is formed over the entire region of the protruding piece.

6. The wave washer according to claim 1,
   wherein the protruding piece protrudes inward from the body.

7. A variable-flow-rate valve comprising:
   a valve body which opens and closes an opening portion of a gas flow rate variable passage formed in a housing;
   a stem which is supported by the housing to be rotatable while the valve body is connected to a first end thereof;
   a cylindrical bearing which is inserted through a through-hole of the housing and rotatably supports the stem;
   a link member that is connected to a second end of the stem protruding from an end surface of the housing of the bearing; and
   the wave washer according to claim 1 which is disposed in a gap between the end surface of the bearing and the link member and through which the stem is inserted.

8. A variable-flow-rate valve comprising:

a valve body which opens and closes an opening portion of a gas flow rate variable passage formed in a housing;

an attachment member which includes a front end portion having the valve body attached thereto;

a stem which is supported by the housing to be rotatable while a base end portion of the attachment member is connected to a first end thereof;

a cylindrical bearing which is inserted through a through-hole of the housing and rotatably supports the stem; and the wave washer according to claim 1 which is disposed in a gap between the base end portion of the attachment member and an end surface of the bearing inside the housing and through which the stem is inserted.

9. A variable-flow-rate valve comprising:

a valve body which opens and closes an opening portion of a gas flow rate variable passage;

a valve shaft which is provided in the valve body and protrudes toward a side opposite to the opening portion;

an attachment member that includes a front end portion having the valve shaft inserted therethrough and having the valve body attached thereto;

a clasp which is connected to an end portion opposite to the valve body in the valve shaft and protruding from the attachment member; and the wave washer according to claim 1 which is disposed in a gap between the attachment member and the clasp and through which the valve shaft is inserted.

10. A variable-flow-rate valve comprising:

a valve body which opens and closes an opening portion of a gas flow rate variable passage;

a valve shaft which is provided in the valve body and protrudes toward a side opposite to the opening portion;

an attachment member which includes a front end portion having the valve shaft inserted therethrough and having the valve body attached thereto; and the wave washer according to claim 1 which is disposed in a gap between the valve body and the attachment member and through which the valve shaft is inserted.

\* \* \* \* \*